United States Patent
Daniels et al.

(10) Patent No.: US 7,761,356 B2
(45) Date of Patent: Jul. 20, 2010

(54) SYSTEM AND METHOD FOR PROCESSING LOAN APPLICATIONS

(75) Inventors: Marcus Jacobus Daniels, New York, NY (US); Michael L. Whitten, Saint Marys, GA (US)

(73) Assignee: Bank of America Corporation, Charlotte, NC (US)

( * ) Notice: Subject to any disclaimer, the term of this patent is extended or adjusted under 35 U.S.C. 154(b) by 105 days.

(21) Appl. No.: 11/833,013

(22) Filed: Aug. 2, 2007

(65) Prior Publication Data

US 2009/0037321 A1 Feb. 5, 2009

(51) Int. Cl.
G06Q 40/00 (2006.01)
(52) U.S. Cl. .................................. 705/35; 705/36 R
(58) Field of Classification Search ......... 705/35–36 R, 705/38
See application file for complete search history.

(56) References Cited

U.S. PATENT DOCUMENTS

| | | | | |
|---|---|---|---|---|
| 5,995,947 | A * | 11/1999 | Fraser et al. ................... | 705/38 |
| 6,691,094 | B1 * | 2/2004 | Herschkorn ................... | 705/37 |
| 7,146,337 | B1 | 12/2006 | Ward et al. | |
| 2002/0038285 | A1 | 3/2002 | Golden et al. | |
| 2002/0116327 | A1 * | 8/2002 | Srinivasan ................... | 705/38 |
| 2002/0152155 | A1 * | 10/2002 | Greenwood et al. ........... | 705/38 |
| 2003/0033241 | A1 | 2/2003 | Harari | |
| 2003/0055778 | A1 | 3/2003 | Erlanger | |
| 2003/0135451 | A1 * | 7/2003 | O'Brien et al. ................ | 705/38 |
| 2003/0163414 | A1 | 8/2003 | O'Brien et al. | |
| 2004/0024692 | A1 | 2/2004 | Turbeville et al. | |
| 2004/0128230 | A1 | 7/2004 | Oppenheimer et al. | |
| 2004/0225596 | A1 * | 11/2004 | Kemper et al. ................ | 705/38 |
| 2006/0129477 | A1 * | 6/2006 | Goodwin et al. .............. | 705/37 |
| 2009/0037322 | A1 | 2/2009 | Daniels et al. | |

OTHER PUBLICATIONS

International Search Report for Application No. PCT/US08/72119, dated Jun. 3, 2009.
International Search Report for Application No. PCT/US08/72127, dated Jun. 23, 2009.
International Preliminary Patentability Report for PCT Application No. PCT/US2008/072119, mailed Feb. 11, 2010.
International Preliminary Patentability Report for PCT Application No. PCT/US2008/072127, mailed Feb. 11, 2010.

* cited by examiner

*Primary Examiner*—James P Trammell
*Assistant Examiner*—Elda Milef
(74) *Attorney, Agent, or Firm*—Banner & Witcoff, Ltd.; Michael A. Springs

(57) ABSTRACT

A method for processing loan applications includes several steps, and may be practiced with a financial institution including an origination entity and a distribution entity. Loan applications are received from a plurality of applicants, at the origination entity. Each of the loan applications is submitted to an underwriting entity for evaluation, along with some information for each loan application. The underwriting entity approves or denies the loan applications. Each of the denied loan applications is reviewed at the distribution entity, to determine whether each denied loan application is acceptable for syndication or securitization. A message is communicated from the distribution entity to the origination entity, and includes an indication of whether one of the denied loan applications is acceptable for syndication or securitization. A system can include components for practicing the method.

24 Claims, 11 Drawing Sheets

SYSTEM AND METHOD FOR PROCESSING LOAN APPLICATIONS

TECHNICAL FIELD

The invention relates to a system and method for processing loan applications, and more specifically, to a system and method for optimizing processing and distribution of loans and loan applications.

BACKGROUND OF THE INVENTION

Loans, including mortgage loans, home equity lines of credit, and other debt creation mechanisms, have been instrumental in economic growth over history. Financial institutions may distribute loans through various distribution mechanisms, including portfolio placement, syndication, and securitization. Briefly, the portfolio of a financial institution stores loans and parts of loans owned by the financial institution, which receives payments from the borrower to repay the loans. Depending on various concerns, the financial institution may wish to have loans having certain specified characteristics in the portfolio. Some loans may be syndicated or securitized for various reasons, such as when a financial institution wishes to gain capital to create more loans or when syndication or securitization of a loan currently in the portfolio is determined to be more profitable. Syndicating a loan typically involves dividing the loan into several pieces and selling one or more of the pieces to one or more other entities. Accordingly, syndication is often performed on very large loans. Securitization involves pooling a loan (or a part thereof) with other loans or parts of loans, and issuing a bond against the loan assets. In many prior financial institutions, loans are originated primarily to grow the portfolio for the institution, and loans that are too large or otherwise unfavorable (such as due to risk or other characteristics) are later syndicated or securitized. In such existing methods, the result of the financial institution's underwriting process typically determines whether a loan will be created, and many loans that may present profit through syndication or securitization may be denied.

SUMMARY OF THE INVENTION

The present system and method are provided to solve the problems discussed above and other problems, and to provide advantages and aspects not provided by prior systems and methods of this type.

Aspects of the present invention relate to a method for processing loan applications that includes several steps, and may be practiced with a financial institution including an origination entity and a distribution entity. Loan applications are received from a plurality of applicants, at the origination entity. Each of the loan applications is submitted to an underwriting entity for evaluation, along with some information for each loan application. The underwriting entity approves or denies the loan applications. Each of the denied loan applications is reviewed at the distribution entity, to determine whether each denied loan application is acceptable for syndication or securitization. A message is communicated from the distribution entity to the origination entity, and includes an indication of whether one of the denied loan applications is acceptable for syndication or securitization.

Additional aspects of the invention relate to a method for processing loan applications that includes several steps, and may be practiced in connection with a financial institution including an origination entity and a distribution entity. The distribution entity may include a portfolio management entity, a syndication management entity, and a securitization management entity. A plurality of loan applications are received from a plurality of applicants, at the origination entity. A forum is provided for competitive bidding among the portfolio management entity, the syndication management entity, and the securitization management entity, for each of the plurality of loan applications. Loans resulting from the loan applications are distributed through a winner of the competitive bidding among the portfolio management entity, the syndication management entity, and the securitization management entity.

Further aspects of the invention relate to a method for processing loan applications that may be practiced in connection with a financial institution including an origination entity and a distribution entity. The distribution entity may include a portfolio management entity, a syndication management entity, and a securitization management entity. Loan applications are received from a plurality of applicants, at the origination entity. Each of the loan applications is submitted to an underwriting entity for evaluation, along with at least some information for each loan application. The underwriting entity approves or denies the loan applications. Each of the approved loan applications is analyzed to determine a first designated entity for each approved loan application among the portfolio management entity, the syndication management entity, and the securitization management entity, based on a projected profitability for each of the portfolio management entity, the syndication management entity, and the securitization management entity corresponding to the loan application. Each of the denied loan applications is analyzed to determine whether each denied loan application is acceptable for syndication or securitization and to determine a second designated entity for each acceptable denied loan application between the syndication management entity and the securitization management entity, based on a projected profitability for each of the syndication management entity and the securitization management entity corresponding to the loan application. Loans are created, corresponding to each approved loan application and to each acceptable denied loan application. The loan corresponding to each approved loan application is distributed to the first designated entity for the approved loan application, and the loan corresponding to each acceptable denied loan application is distributed to the second designated entity for the acceptable denied loan application.

Further aspects of the invention provide systems for practicing various embodiments of the method of the invention, including a plurality of entities, such as an origination entity or distribution entity of a financial institution. The distribution entity may contain a portfolio management entity, a syndication management entity, and a securitization management entity. The system may also contain a computer system and a web portal for connection by the various entities. The computer system may support an internal auction system.

A full discussion of the features and advantages of the present invention is deferred to the following detailed description, which proceeds with reference to the accompanying drawings.

BRIEF DESCRIPTION OF THE DRAWINGS

To understand the present invention, it will now be described by way of example, with reference to the accompanying drawings in which.

DETAILED DESCRIPTION

Figure 1:
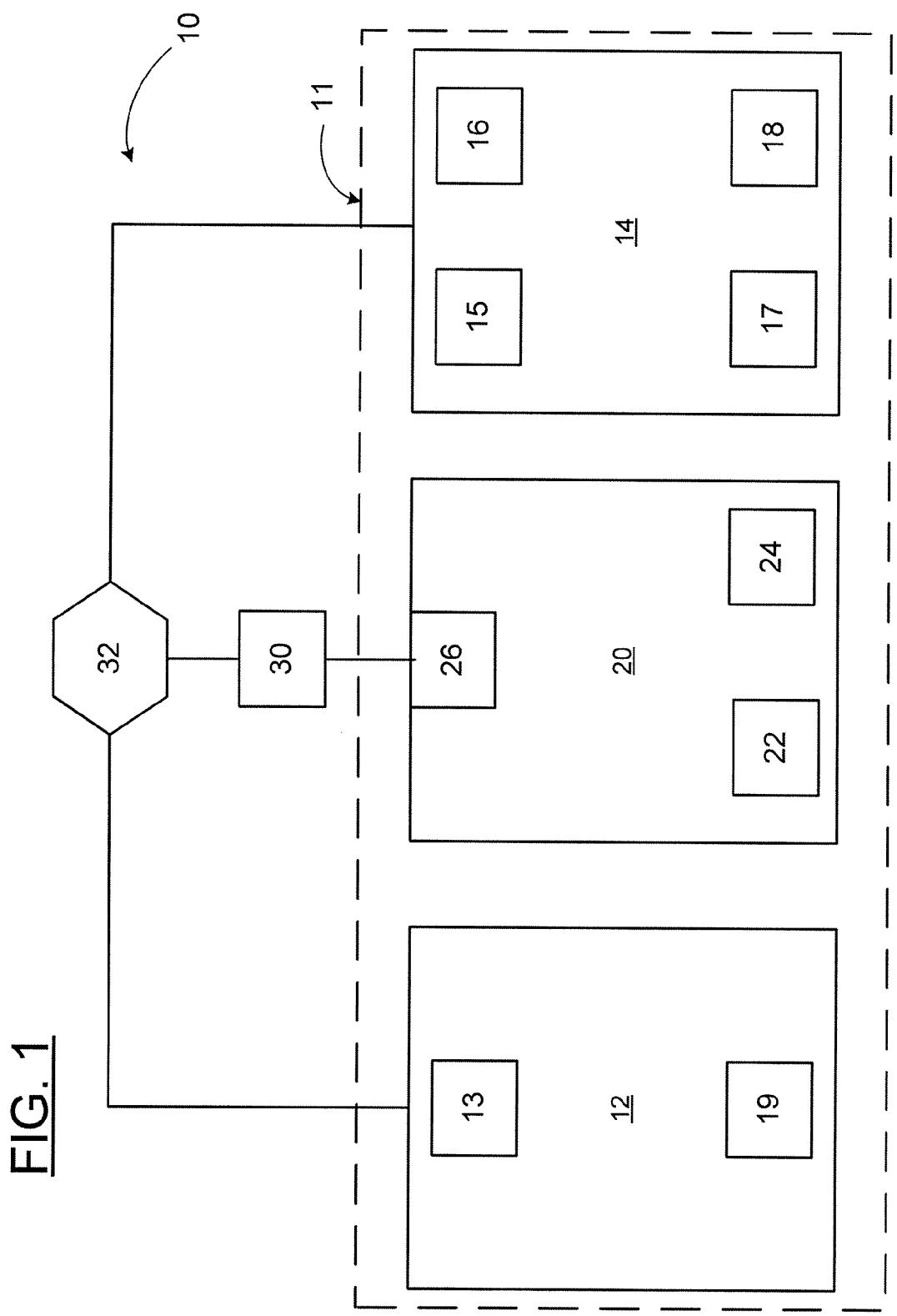
FIG. 1 is a schematic view of one embodiment of a system for processing loan applications.

While this invention is susceptible of embodiments in many different forms, exemplary embodiments of the invention are shown in the drawings and will herein be described in detail with the understanding that the present disclosure is to be considered as an exemplification of the principles of the invention and is not intended to limit the broad aspect of the invention to the embodiments illustrated.

FIG. 1 illustrates an exemplary system 10 that is capable of utilizing the disclosed method for processing loan applications. The disclosed system and method can be used by or in connection with a bank or other financial institution, for example an investment firm or other business, or a government institution. The system 10 illustrated in FIG. 1 includes an origination entity 12, a distribution entity 14, and a computer system 20 in communication with the origination entity 12 and the distribution entity 14. Portions of the system 10 are illustrated in FIG. 1 as being incorporated into a financial institution 11, such as a bank, having a plurality of institutional employees. In the embodiment of FIG. 1, the origination entity 12, the distribution entity 14, and the computer system 20 are shown as part of the financial institution 11. The system 10 may also include an underwriting entity 19.

The origination entity 12 serves to originate loan applications, some of which result in loans being generated. The origination entity 12 may include several smaller entities, such as client management and service entities. In the embodiment shown in FIG. 1, the origination entity 12 includes the underwriting entity 19, although the underwriting entity 19 may be separate from the financial institution 11 in other embodiments. Generally, an applicant, such as a person, business, or other entity, comes into contact with the origination entity 12 to request a loan. This contact may be initiated by the origination entity 12 or the applicant. The origination entity 12 collects a variety of different information regarding the applicant and the loan requested. Some of the information may be collected directly from the applicant, for example, the applicant's name and identification information, and the amount of money desired to be borrowed. Other information may be collected from other sources, for example, the applicant's credit history and rating. The origination entity 12 may contain its own computer system 13, containing one or more memories and processors (not shown), as illustrated in FIG. 1.

The distribution entity 12 generally manages where a loan is placed after the loan is created. As shown in FIG. 1, the distribution entity 12 contains several separate management entities, including a portfolio management entity 15, a syndication management entity 16, and a securitization management entity 17. The portfolio management entity 15 manages the portfolio of assets for the financial institution 11, including a plurality of loans and portions of loans owned by the financial institution 11. The syndication management entity 16 manages syndication of loans for the financial institution 11, including structuring and planning such syndication. The securitization management entity 17 manages securitization of loans for the financial institution 11, including structuring and planning such securitization. The distribution entity 12 and management entities 15, 16, 17 may desire particular types loans for certain purposes based on present circumstances. For example, the portfolio management entity 15 may desire a certain type of loan for the portfolio based on investment strategy and/or the type of loans already in the portfolio, for example, high risk, high interest rate loans, low risk, low interest rate loans, or loans having a certain term or structure. Thus, a single loan may be projected to have a different level of potential profitability or desirability for each management entity 15, 16, 17, depending on the circumstances at the time. It is understood that, in some embodiments, the portfolio management entity 15, syndication management entity 16, and securitization management entity 17 may be consolidated into a single entity within the distribution entity 12. The distribution entity 14 may contain its own computer system 18, containing one or more memories and processors (not shown), as illustrated in FIG. 1.

The computer system 20 may be configured to include a memory 22 and a processor 24. It is understood that a computer system 20, single processor 24, and single memory 22 are shown and described for sake of simplicity, and that the computer system 20, processor 24, and memory 22 of the system 10 may include a plurality of computer systems, processors, and memories, respectively. The same is true of other computers and computer systems, processors, and memories referred to herein. The computer system 20 is connected to the origination entity 12 and the distribution entity 14 to allow communication between the origination entity 12, the distribution entity 14, and the computer system 20, and generally provides an information gateway 26 between the origination entity 12 and the distribution entity 14. In the embodiment shown in FIG. 1, the computer system 20 is connected to the origination entity 12 and the distribution entity 14 through a web portal 30 connected to a network 32, such as the Internet. However, in other embodiments, the computer system 20 may be connected to the origination entity 12 and the distribution entity 14 through another means, such as a LAN or other private network.

The underwriting entity 19 is depicted in FIG. 1 as being part of the origination entity 12. However, in other embodiments, the underwriting entity may be separate from the financial institution 11. Generally, the underwriting entity 19 underwrites each loan application for the financial institution 11, through analyzing information regarding the applicant and the proposed loan, to project whether the proposed loan would be profitable for the financial institution 11, based on such factors as balancing potential risk and yield. This underwriting process is described in greater detail below.

Figure 2:
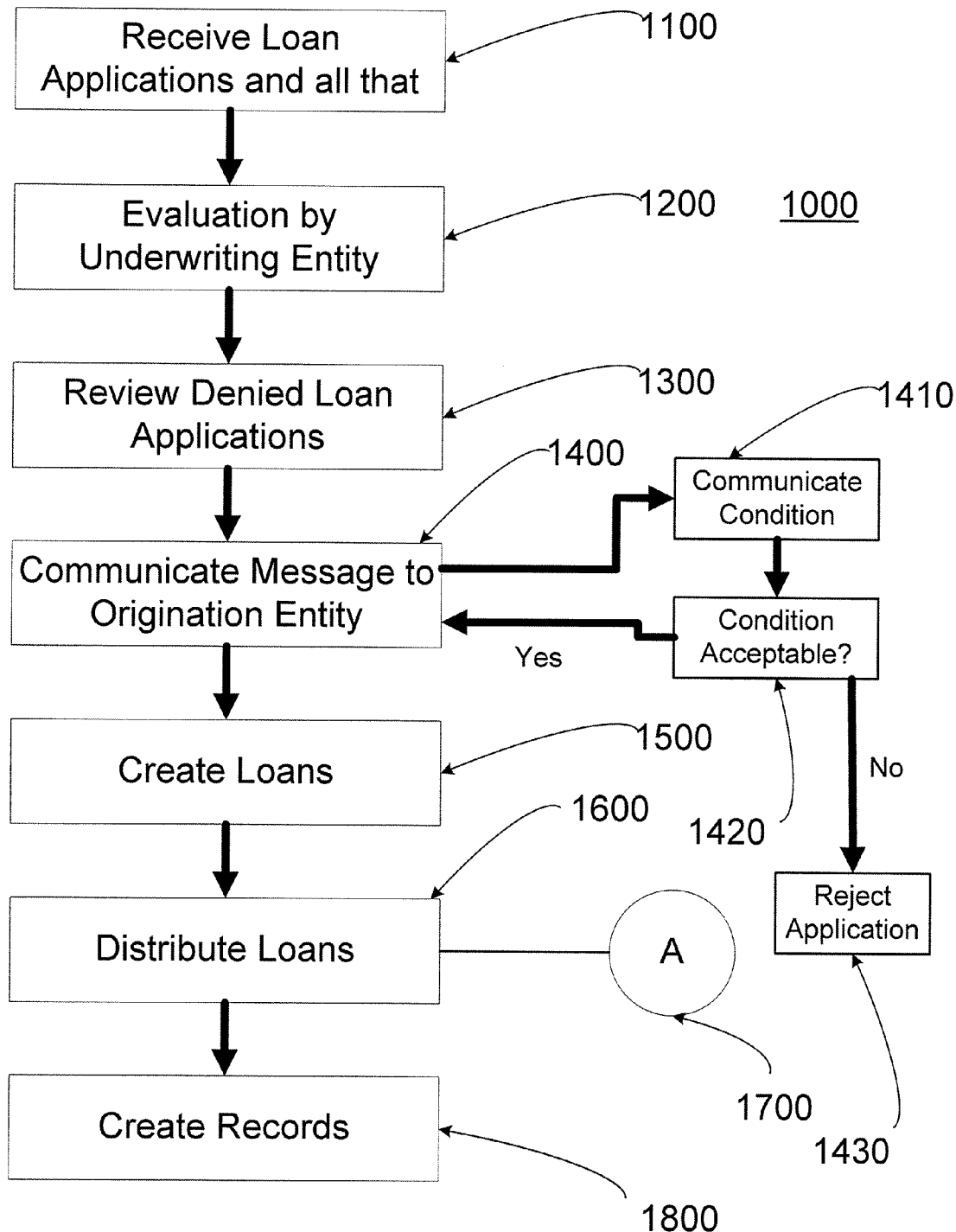
FIG. 2 is a flowchart depicting one embodiment of a method for processing a loan application.

An exemplary embodiment of a method 1000 for processing loan applications is illustrated in FIG. 2. The method 1000 of FIG. 2, and variations thereof, may be practiced in connection with the system 10 shown in FIG. 1, or with other systems, such as the other system embodiments described herein. At step 1100, at least one loan application is received, at the origination entity 12, from at least one applicant. As described above, each application may include information about the application and the corresponding applicant. Generally, the information may include a plurality of proposed terms for the loan, including the loan amount, structure, term, and/or interest rate of the loan. In many embodiments, the origination entity 12 receives a plurality of loan applications from a plurality of applicants. It is understood that some applicants may submit one application apiece, while other applicants (for example, large business clients) may occasionally submit many applications.

At step 1200, each loan application is submitted to the underwriting entity 19 for evaluation. Generally, at least some of the information gathered for each loan application is also submitted to the underwriting entity 19. As described above, the underwriting entity 19 underwrites each loan application for the financial institution 11, through analyzing information regarding the applicant and the proposed loan, to project whether the proposed loan would be profitable for the financial institution 11, based on such factors as balancing potential risk and yield. If the underwriting entity 19 determines that a loan application presents suitable potential profitability, the loan application is approved. If, however, the underwriting entity 19 determines that a loan application does not present suitable potential profitability, the loan application is denied. In one embodiment, the underwriting entity 19 approves or denies each loan application using standards set by the portfolio management entity 15 for placement of loans into the portfolio for the financial institution 11. Typically, the underwriting entity 19 will communicate to the origination entity 12 whether each loan application is approved or denied.

At step 1300, each of the denied loan applications and at least some of the information for each denied loan application is reviewed, to determine whether each denied loan application is acceptable for syndication and/or securitization. Like the underwriting step 1200, this determination may be based on projected profitability to the institution 11 through syndication or securitization, including projected risk and projected yield. The determination may also be based on contractual or legal restrictions preventing certain loans from being securitized or syndicated. Additionally, this determination may include one or more conditions for acceptability for syndication or securitization, which may include a change in the proposed terms of the loan application. For example, the distribution entity 14 may determine that the loan application, with the original proposed terms, may not be acceptable for syndication and/or securitization, but would be acceptable if one or more conditions are met, such as raising the interest rate, changing the term or structure of the loan, or including greater or different collateral or other securitization. The processing of such conditions is described in greater detail below. In one exemplary embodiment, this review of the loan applications is done by the distribution entity 14, such as by the corresponding syndication management entity 16 and securitization management entity 17. It is understood that the underwriting entity 19 may perform this evaluation in other embodiments. Additionally, as described below with respect to method 2000, this evaluation may be done in conjunction with competitive bidding between the portfolio management entity 15, the syndication management entity 16, and the securitization management entity 17. Optionally, the approved loan applications may also be independently reviewed to determine whether each approved loan application is acceptable for placement in the portfolio, syndication, or securitization. However, in the exemplary embodiment illustrated, approved loan applications are automatically considered to be acceptable for placement in the portfolio of the financial institution 11, as well as for syndication and securitization.

At step 1400, the distribution entity 14 communicates a message to the origination entity 12. The message contains an indication of whether one of the denied loan applications is acceptable for syndication and/or securitization. In one embodiment, this message is an electronic message, however, as with other communications described herein, the message may be transmitted by any known means of communication. It is understood that the method 1000 may involve sending a plurality of such messages, each corresponding to one of the denied loan requests. The message may also contain at least one condition for the denied loan application to be acceptable for syndication and/or securitization, as described above. If the message contains such a condition, the origination entity 12 may communicate the condition(s) to the applicant, at step 1410, and may receive a notification from the applicant regarding whether the condition(s) are acceptable, at step 1420. If the additional condition(s) are acceptable to the applicant, then the loan application is acceptable for syndication and/or securitization. Each loan application that is not approved and is not found to be acceptable for at least one of the portfolio, securitization, or syndication, is rejected by the institution 11, at step 1430.

At step 1500, loans are created by the origination entity corresponding to each approved loan request and to each denied loan request that is determined to be acceptable for syndication and/or securitization. Each loan may be created in a known manner.

At step 1600, each created loan is distributed through one of the portfolio management entity 15, the syndication management entity 16, or the securitization management entity 17. If the loan application is found to be acceptable for only one of the distribution mechanisms, then the loan is distributed to the management entity 15, 16, 17 corresponding to the acceptable distribution mechanism. If the loans are acceptable for more than one of the management entities 15, 16, 17, then a determination may be made regarding which entity will distribute the loan, at step 1700. In one embodiment, this determination is made by evaluation of the potential profitability of the loan through placement in the portfolio, syndication, and/or securitization, and the loan is awarded to the entity having the highest potential profitability. In another embodiment, all loans resulting from approved loan applications are sent initially to the portfolio management entity 15, and can later be sent to one of the other entities at the discretion of the institution 11.

Figure 3:
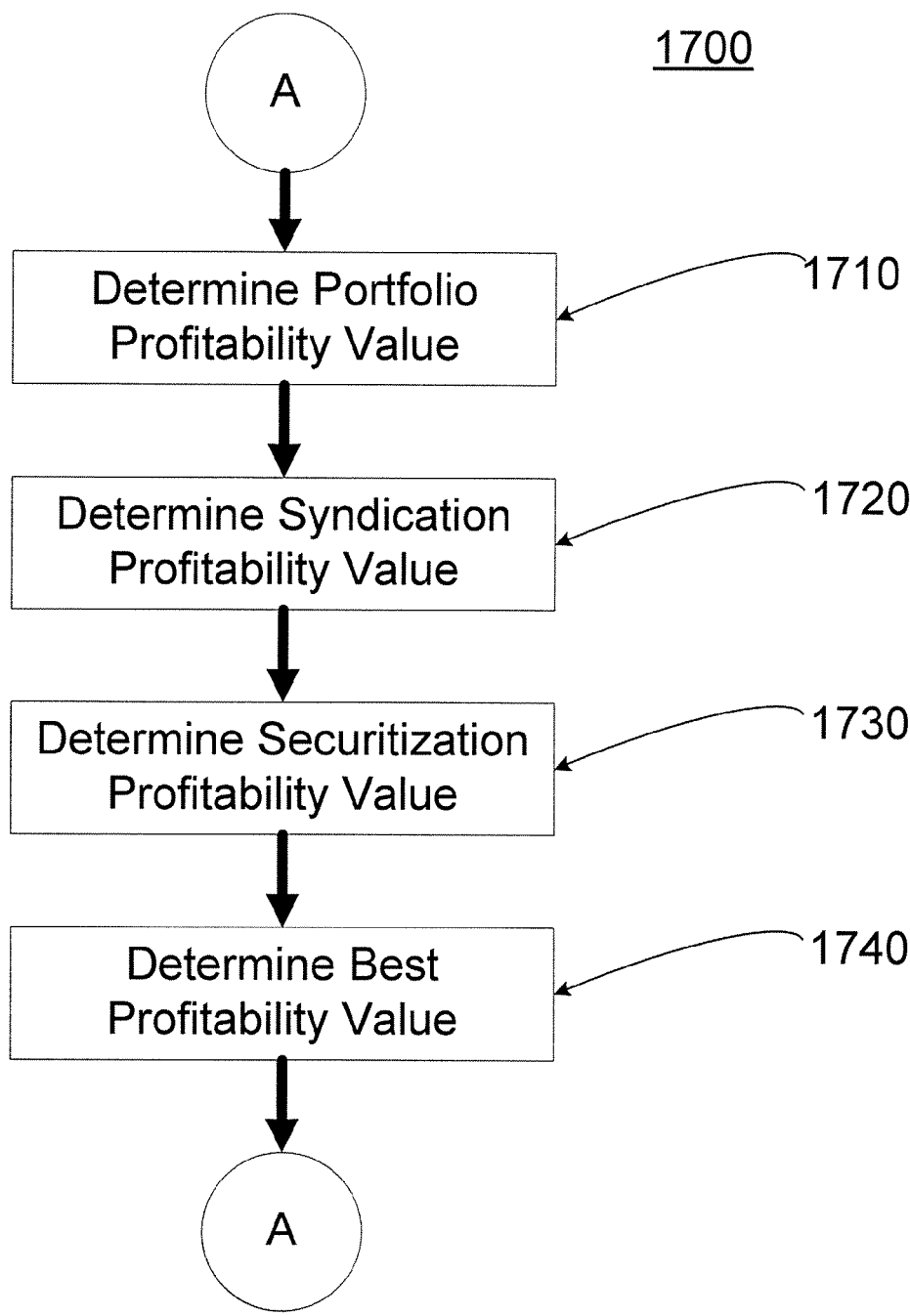
FIG. 3 illustrates one embodiment of a method of determining an entity for distribution, as part of the method of FIG. 2.

FIG. 3 illustrates one embodiment of a method of determining an entity for distribution, for performing step 1700. In FIG. 3, each loan application is analyzed to determine a portfolio profitability value for the portfolio of the financial institution, at step 1710, to determine a syndication profitability value for syndication by the financial institution, at step 1720, and to determine a securitization profitability value for securitization by the financial institution, at step 1730. This analysis may be performed based on the proposed terms of each loan application. In one embodiment, the portfolio profitability value, the syndication profitability value, and the securitization profitability value for each loan application may be used in analysis by the distribution entity 14 and/or the underwriting entity 19, to determine whether each loan application is acceptable for at least one of the distribution mechanisms, such as at step 1300. In another embodiment, the method may include separate profitability analyses, and loans previously determined to be unacceptable for the portfolio, syndication, and/or securitization may consequently have one or more of separate profitability analyses omitted. For example, loans that are denied by the underwriting entity 19 and considered unacceptable for placement in the portfolio may not be separately evaluated for profitability through distribution through the portfolio management entity 15. Accordingly, in this embodiment, each denied loan application may be analyzed only to determine a syndication profitability value, at step 1720, and to determine a securitization profitability value, at step 1730, and step 1710 may be omitted from the analysis. At step 1740, the distribution mechanism having the highest corresponding profitability value is determined and designated as the entity to distribute the loan. Returning to step 1600, the loan is distributed through the entity with the highest corresponding profitability value.

Projected "profitability," as referred to herein, may be determined by subjective standards set by the financial institution 11, incorporating such factors as projected risk, projected yield, diversification concerns, and any other factors the financial institution 11 considers important for profitability. It is also noted that "profitability," as referred to herein, may contemplate not only the profitability to the particular entity distributing the loan, but the profitability to the entire financial institution 11 as a whole as a result of a particular distribution mechanism. Thus, the profitability for placing the loan in the portfolio may be directly related to the profitability for securitizing or syndicating the loan. Additionally, the projected profitability of a loan may be affected by external factors, for example, diversification concerns raised by the characteristics of the loans already in the portfolio of the financial institution 11.

In the distribution step 1600, each management entity 15, 16, 17 distributes loans in its own customary manner. In other words, the portfolio management entity 15 distributes the loan by placing the loan in the portfolio for the financial institution 11. Likewise, the syndication management entity 16 distributes the loan through syndication, and the securitization management entity 17 distributes the loan through securitization.

It is noted that one or more of the loans created through the disclosed method may be divided into parts for distribution. In such a case, one part of the loan may be distributed by one mechanism, such as placement in the portfolio, and one or more other parts of the loan may be distributed by one or more other mechanisms, such as syndication and securitization.

At step 1800, records related to each loan application are created and stored. In one exemplary embodiment, the records are electronic records that are stored, for example, in memory 22. In other embodiments, the records may be physical records, or a mix of different types of records. The stored records may include records of each step in the above-described method 1000. In one embodiment, a prime record is created and stored for each loan created and/or distributed through the financial institution 11. A prime record, as known in the art, contains all necessary details of the loan transaction and contract, including information such as the names of the transacting parties, the terms of the transaction, the date of the transaction, and any other necessary information. As described above, in one embodiment, this prime record may be an electronic record stored in the memory 22. Prime records provide great value for the financial institution 11 and the applicant, and are often securely protected.

In addition to the prime records for each loan, in one exemplary embodiment, a securitization prime record is also created to represent each securitization transaction. In other words, when a loan is distributed through securitization, a prime record of the transaction is created. Generally, as known in the art, a securitization transaction involves a first entity that owns one or more loans and a second entity, known as a special purpose vehicle, that capable of issuing one or more bonds. The first entity "sells" the loan(s) to the second entity in return for one or more issued bonds, thus effectively "transforming" the loan assets into bond assets, from the perspective of the first entity. In other words, the second entity buys one or more loans and issues one or more bonds corresponding to the loan(s) through the securitization transaction.

Figure 11:
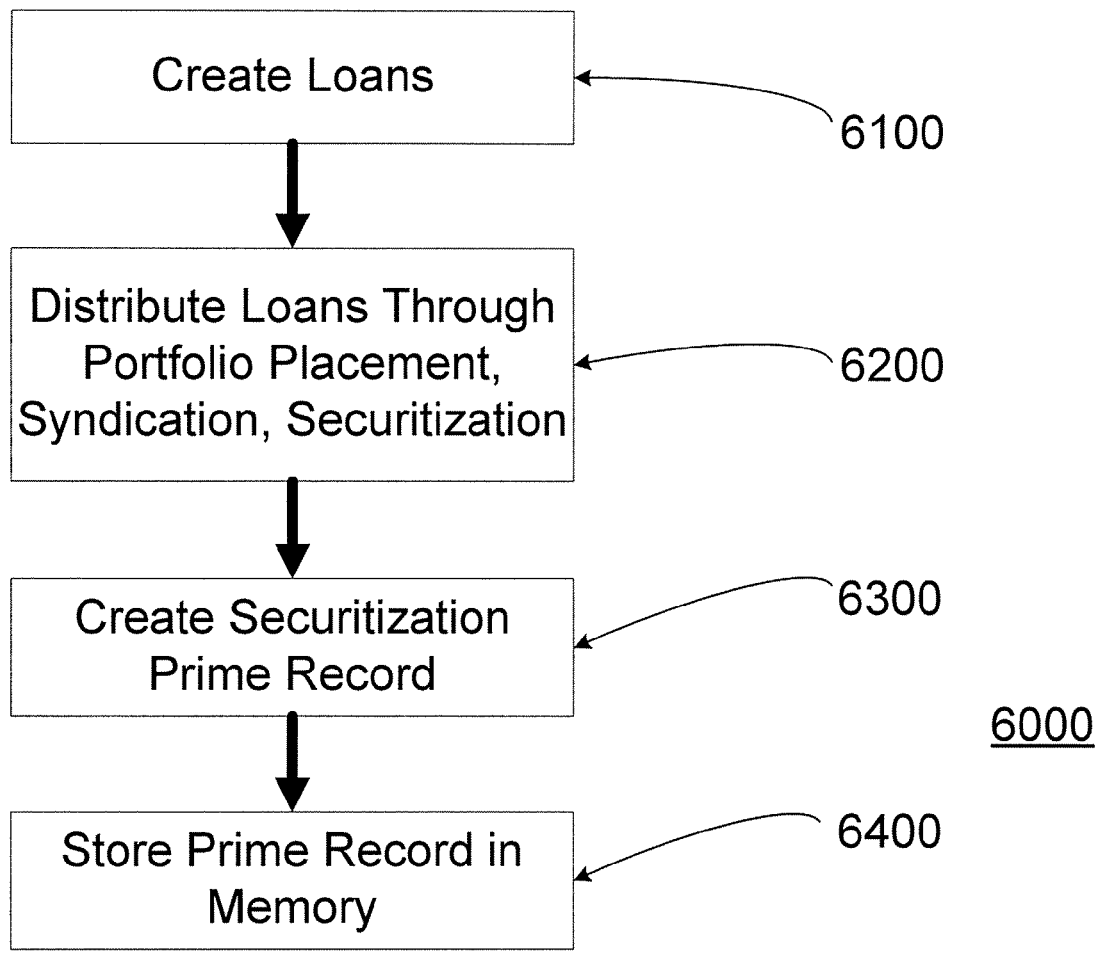
FIG. 11 illustrates one embodiment of a method for processing a loan application through distribution by securitization.

In the system 10 shown in FIG. 1, the financial institution 11 has a securitization management entity 17 to manage securitization of the loans, and either the financial institution 11 or the securitization management entity 17 can operate as the first entity as described above. The second entity referred to above is often an entity known as a "special purpose vehicle." FIG. 11 illustrates an exemplary embodiment of a method 6000 for processing loans utilizing securitization prime records, in conjunction with the embodiment of the system 10 shown in FIG. 1. At step 6100, a plurality of loans are created from a plurality of loan applications, in a manner such as described above. At step 6200, the loans are distributed, such as in the manners described above. One group of the loans may be distributed through placement in the portfolio of the financial institution 11, a second group of the loans may be distributed by syndication, and a third group of the loans may be distributed by securitization, through a securitization transaction. At step 6300, a securitization prime record is created for each securitization transaction. It is understood that prime records may also be created for each individual loan that is distributed through any of the mechanisms, upon creation of the loan. At step 6400, the securitization prime record is stored in a memory, such as memory 22.

Like the prime records described above, the securitization prime record may contain a great deal of information regarding the transaction. For example, in one embodiment, the securitization prime record includes an identification of the first entity (for example, the financial institution 11) and the second entity (for example, a special purpose vehicle) conducting the securitization transaction, a description of each loan involved (including a value of the loan), a description of each bond involved (including a corresponding CUSIP number and a value of the bond), and a transaction number to identify the transaction. The availability of the information in the securitization prime record, as well as the ability to identify the transaction by transaction number, allow for generation of financial records and other performance of financial operations related to the securitization transaction, which were previously not possible because of the lack of a securitization prime record. Such operations include, for example, generation of general ledger debit and credit entries, payment and/or delivery information to and from participating parties, transaction confirmations between entities (e.g., legal documentation), time based business intelligence and/or management information, cost information around transactions linking different fees associated with the transaction (e.g., legal, travel, printing, etc.), transaction description summaries, and other types of documentation. Higher processing volume is also enabled by the presence of the securitization prime record. It is understood that the disclosed method of processing a securitization transaction can be used in conjunction with any financial institution, as well as the other embodiments of systems 100, 200, 300 and methods 2000, 3000, 4000, 5000 for processing loan applications described herein below.

Figure 4:
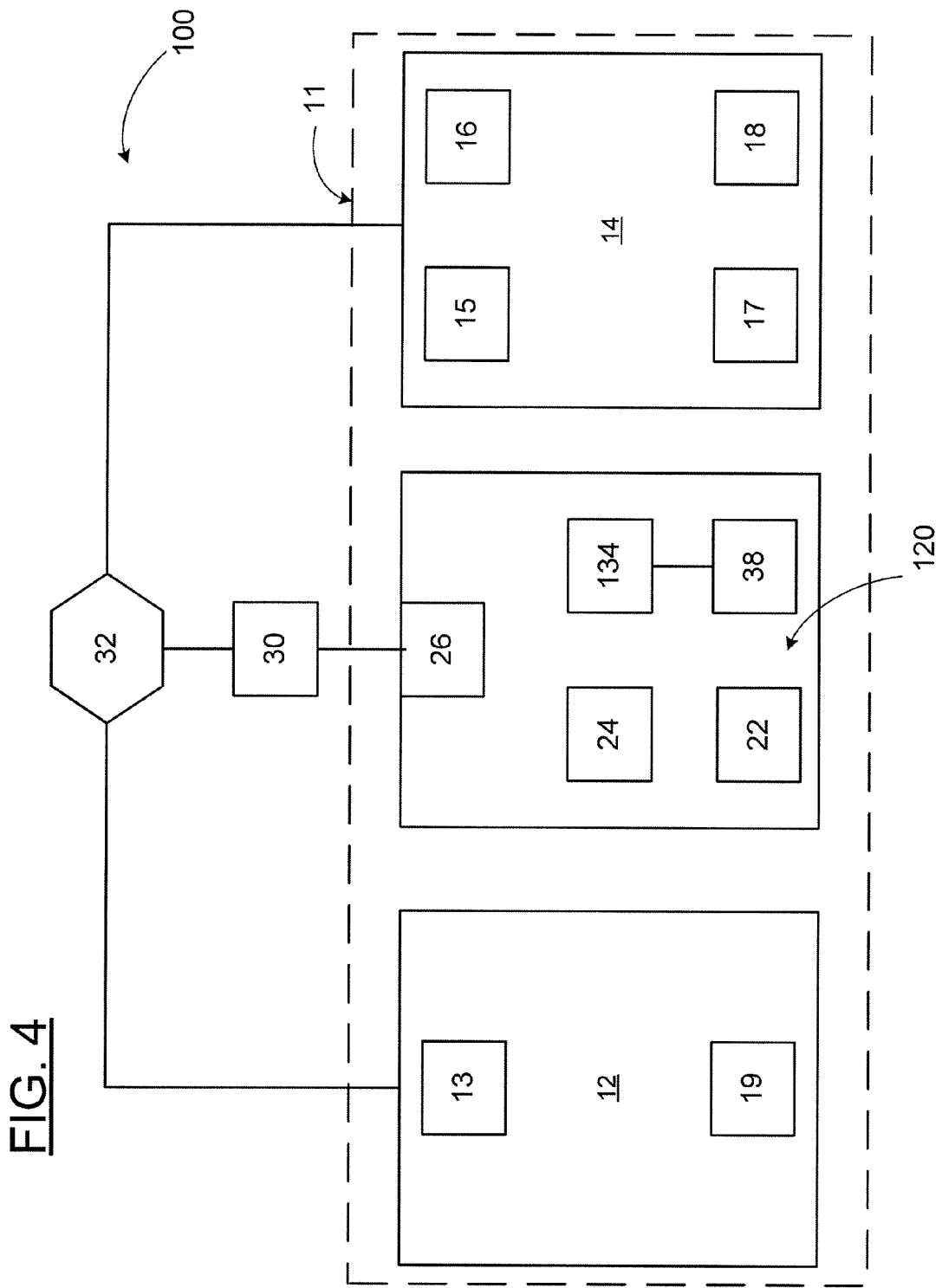
FIG. 4 is a schematic view of a second embodiment of a system for processing a loan application.

FIG. 4 illustrates a second exemplary embodiment of a system 100 that is capable of utilizing the disclosed method for processing loan applications. The system 100 shown in FIG. 4 contains many of the same components as the system 10 shown in FIG. 1 and described above, which are referenced by identical reference numerals. An additional feature of the system 100 shown in FIG. 4 is the internal auction system 134 contained within the computer system 120. The forum of the auction system 134 may also contain a monitor or moderator 38 to oversee the competitive bidding. The internal auction system 134 provides a forum for competitive bidding between the portfolio management entity 15, the syndication management entity 16, and the securitization management entity 17 for one or more loan applications, as described in greater detail below. Generally, the auction system 134, and the forum hosted on the auction system 134, are computer based, and can be accessed through a public network and/or a private network, in various embodiments. In the exemplary embodiment illustrated, the auction system 134 is web-based, and is hosted by a website that is accessed from a public network 32 through the web portal 30. In other embodiments, the internal auction system 134 may be hosted or accessed in a different manner. For example, bids through the auction system may be made in another manner, including electronic and non-electronic communication techniques.

Figure 5:
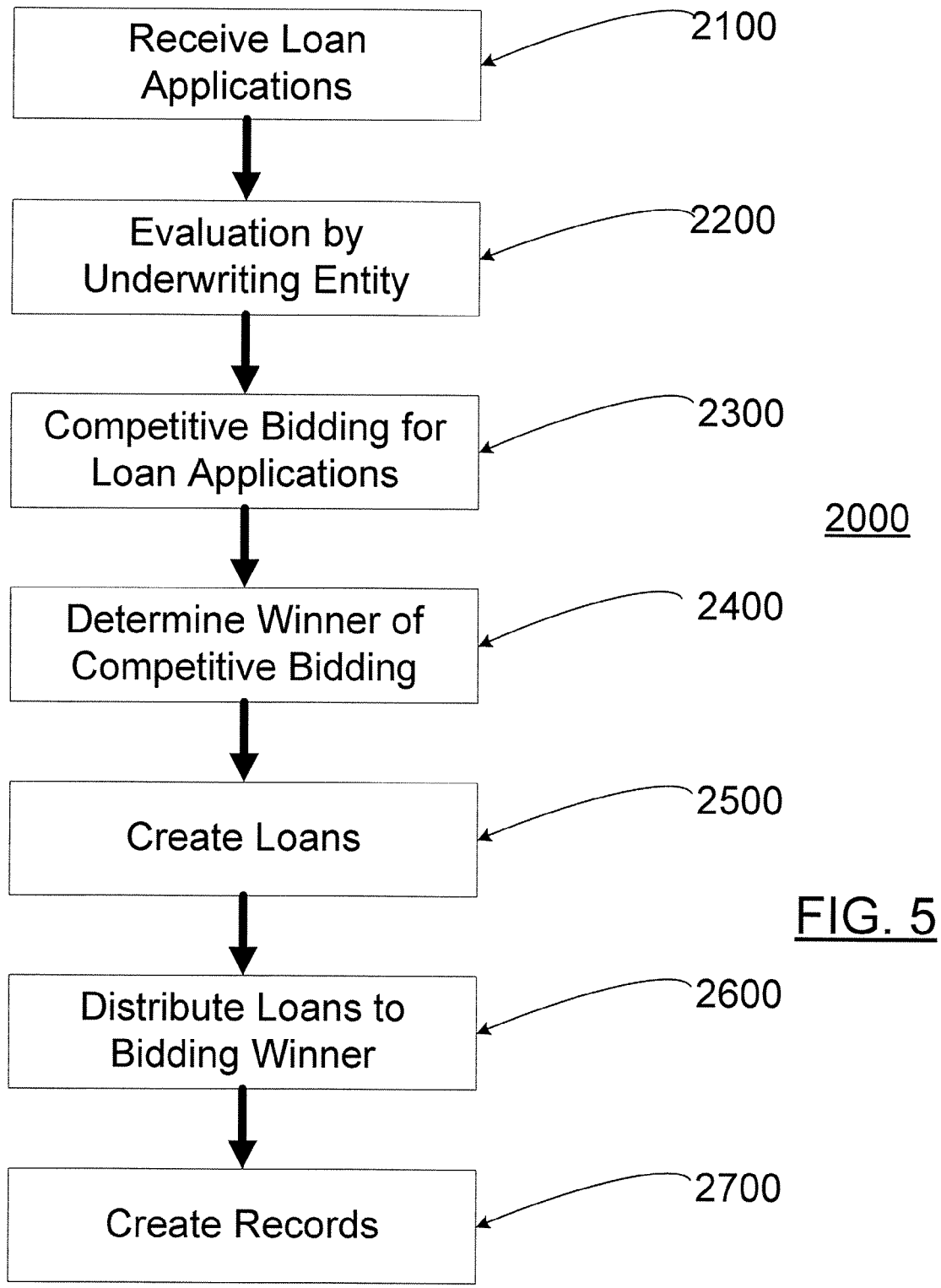
FIG. 5 is a flowchart depicting a second embodiment of a method for processing a loan application.

A second exemplary embodiment of a method 2000 for processing loan applications is illustrated in FIG. 5. The method 2000 of FIG. 5, and variations thereof, may be practiced in connection with the system 100 shown in FIG. 4, or with other systems, such as the other system embodiments described herein. Additionally, the method 2000 contains some steps that are similar to those of the method 1000 shown in FIG. 2 and described above. At step 2100, at least one loan application is received, at the origination entity 12, from at least one applicant, similarly to step 1100 above. At step 2200, each loan application is submitted to the underwriting entity 19 for evaluation, along with at least some of the information gathered for each loan application, similarly to step 1200 above.

At step 2300, each of the loan applications is subjected to competitive bidding among one or more of the portfolio management entity 15, the syndication management entity 16, and the securitization management entity 17. Generally, as described above, a computer-based forum is provided for this competitive bidding. In the exemplary embodiment of the system 100 shown in FIG. 4 and described above, the auction system 134 contains a website providing a web-based forum for such competitive bidding. Each management entity 15, 16, 17 may use various criteria in determining a bid amount. Additionally, the bid may take one of many different forms, and may also include conditions, such as proposed changes to the terms of the application. For example, the entities 15, 16, 17 may submit bids through offering a price to buy a particular loan. In other examples, the entities 15, 16, 17 may submit projected profitability values for a particular loan, or may submit an estimation of the lowest interest rate at which a particular loan could achieve satisfactory profitability, to constitute the bid. Still other forms of bidding are contemplated. However, it is contemplated that in at least some embodiments, all entities 15, 16, 17 may be required to submit bids in the same format.

The forum for competitive bidding may be presented in a variety of manners. Additionally, at least some of the information gathered by the origination entity 12 in connection with the loan application may be made available on the forum. In one embodiment, the forum may present each loan application as a separate posting or listing. In this embodiment, the bidding entities 15, 16, 17 may gather information and submit bids for a loan application by accessing the listing. Other techniques and formats for presenting the forum are contemplated as well.

It is understood that at some point during the method 2000, some or all of the loan applications may be reviewed to determine whether each application is acceptable for placement in the portfolio, syndication, and/or securitization, similarly to step 1300 above. It is also understood that at some point during the method 2000, some or all of the loan applications may be analyzed to determine projected profitability values for placement in the portfolio, syndication, and/or securitization, similarly to step 1700 above. This review and/or analysis, as well as the acceptability and/or projected profitability values produced thereby, may be used in calculating the bid made by each management entity 15, 16, 17 for a particular loan request, or may further be used to constitute the bid itself. Additionally, this review and/or analysis, as well as the acceptability and/or projected profitability values produced thereby, may be used in determining whether the bid can or should be made at all. Accordingly, some entities may be restricted from bidding on certain loan applications. For example, in one embodiment, the portfolio management entity 15, the syndication management entity 16, and the securitization management entity 17 may all bid on loans approved by the underwriting entity 19 (and thus considered unacceptable for portfolio placement), but only the syndication management entity 16 and the securitization management entity 17 may bid on loans denied by the underwriting entity 19. It is also contemplated that, in some embodiments, the bidding process may include messages from the distribution entity 14 to the origination entity, which may include conditions for the bid, similarly to step 1400 above. These conditions may be transmitted to the applicant for consideration, as also described above. In further embodiments, a bid by a particular entity 15, 16, 17 may constitute a representation that the corresponding loan application is acceptable for that particular distribution mechanism, and separate review may not be necessary.

At step 2400, a winner of the competitive bidding is determined, among the portfolio management entity 15, the syndication management entity 16, and the securitization management entity 17. This determination may be done by one of a variety of techniques, including manually by the origination entity 12 or another entity of the financial institution 11, or by an automated algorithm, or by another technique. Additionally, it is understood that, while the winner may be determined among the portfolio management entity 15, the syndication management entity 16, and the securitization management entity 17, not all the entities may bid on each loan application, and some loan applications may receive no bids. Generally, the entity 15, 16, 17 having the best bid for each loan application will be determined to be the winner of the bidding. Accordingly, the method 2000 may be used to determine the most profitable distribution of each loan, maximizing profits of the financial institution 11.

At step 2500, loans are created by the origination entity corresponding to each loan request that receives at least one bid by at least one of the portfolio management entity 15, the syndication management entity 16, and the securitization management entity 17. This creation may be performed similarly to step 1500 above.

At step 2600, each loan is distributed through the winner of the competitive bidding among the portfolio management entity 15, the syndication management entity 16, and the securitization management entity 17, similarly to step 1600 above.

At step 2700, records related to each loan application are created and stored, including a prime record for each loan, similarly to step 1800 above.

Figure 6:
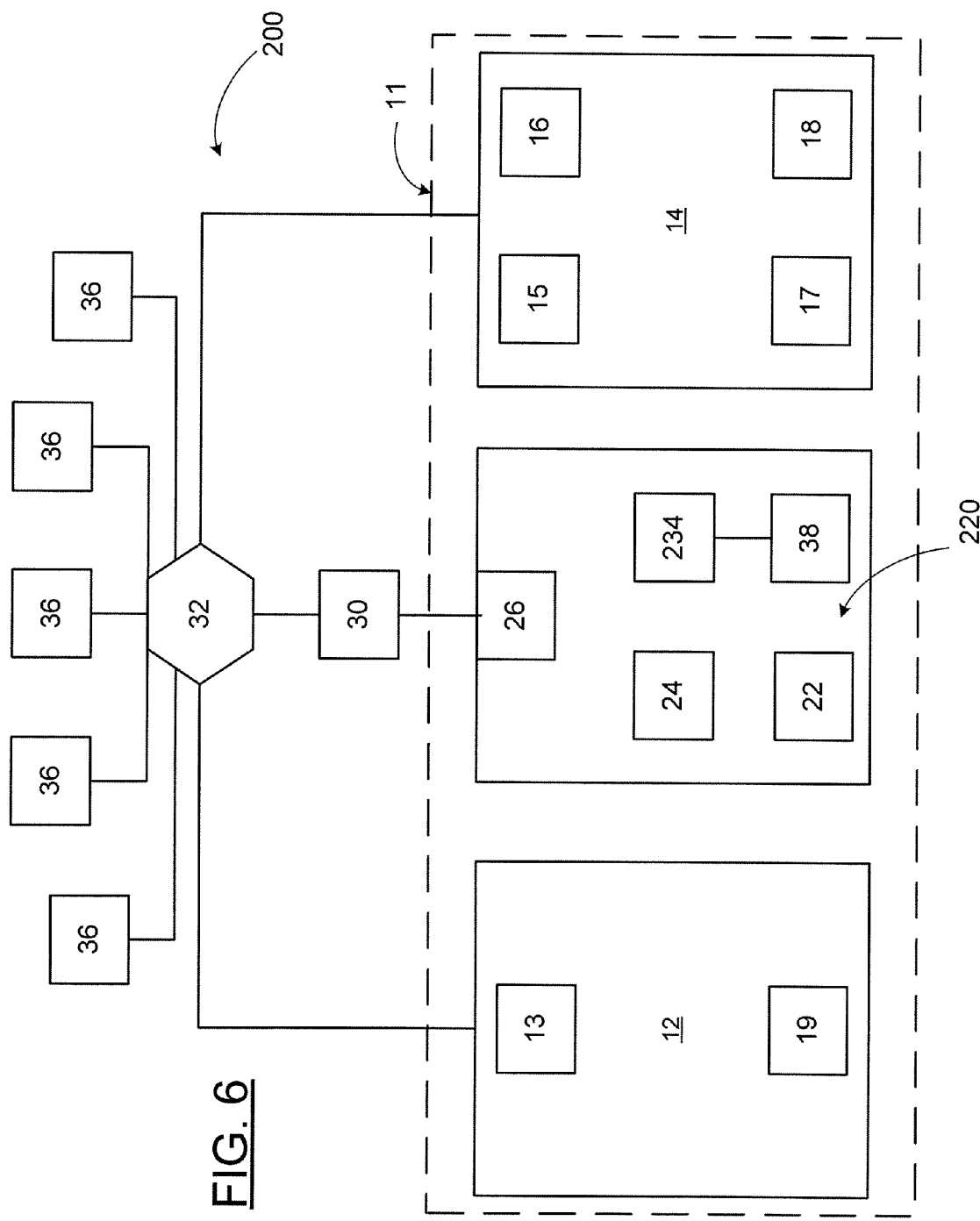
FIG. 6 is a schematic view of a third embodiment of a system for processing a loan application.

FIG. 6 illustrates a third exemplary embodiment of a system 200 that is capable of utilizing the disclosed method for processing loan applications. The system 200 shown in FIG. 6 contains many of the same components as the systems 10 and 100 shown in FIGS. 1 and 4 and described above, which are referenced by identical reference numerals. An additional feature of the system 200 shown in FIG. 6 is the internal/external auction system 234 contained within the computer system 220. The internal/external auction system 234 provides a forum for competitive bidding between the portfolio management entity 15, the syndication management entity 16, the securitization management entity 17, and a plurality of third party entities 36 for one or more loan applications, as described in greater detail below. Generally, the auction system 234, and the forum hosted on the auction system 234, are computer-based, and can be accessed through a public network and/or a private network, in various embodiments. In the embodiment shown in FIG. 6, these third party entities 36 can connect to the auction system 234 from the network 32 through the web portal 30. In some embodiments, the auction system 234 may also provide a forum for competitive bidding for one or more service requests in connection with processing one or more loans, as described in greater detail below. In some embodiments, the auction system 234 may further provide for receiving and bidding on loan applications originated by third party entities 36, as described in greater detail below. In the exemplary embodiment illustrated, the auction system 234 is web-based, and is hosted by a website that is accessed from the network 32 through the web portal 30. In other embodiments, the internal/external auction system 234 may be hosted or accessed in a different manner. For example, bids through the auction system 234 may be made in another manner, including electronic and non-electronic communication techniques.

The forum of the auction system 234 may also contain a monitor or moderator 38 to oversee the competitive bidding. The monitor 38 can be provided with various levels of authority in the forum, including, for example, the authority to exclude certain entities or the authority to take actions to enforce bids made through the auction system 234, as well as other powers. The monitor 38 may perform other functions as well, such as directing attention to postings of loan applications that are not receiving bids.

Figure 7:
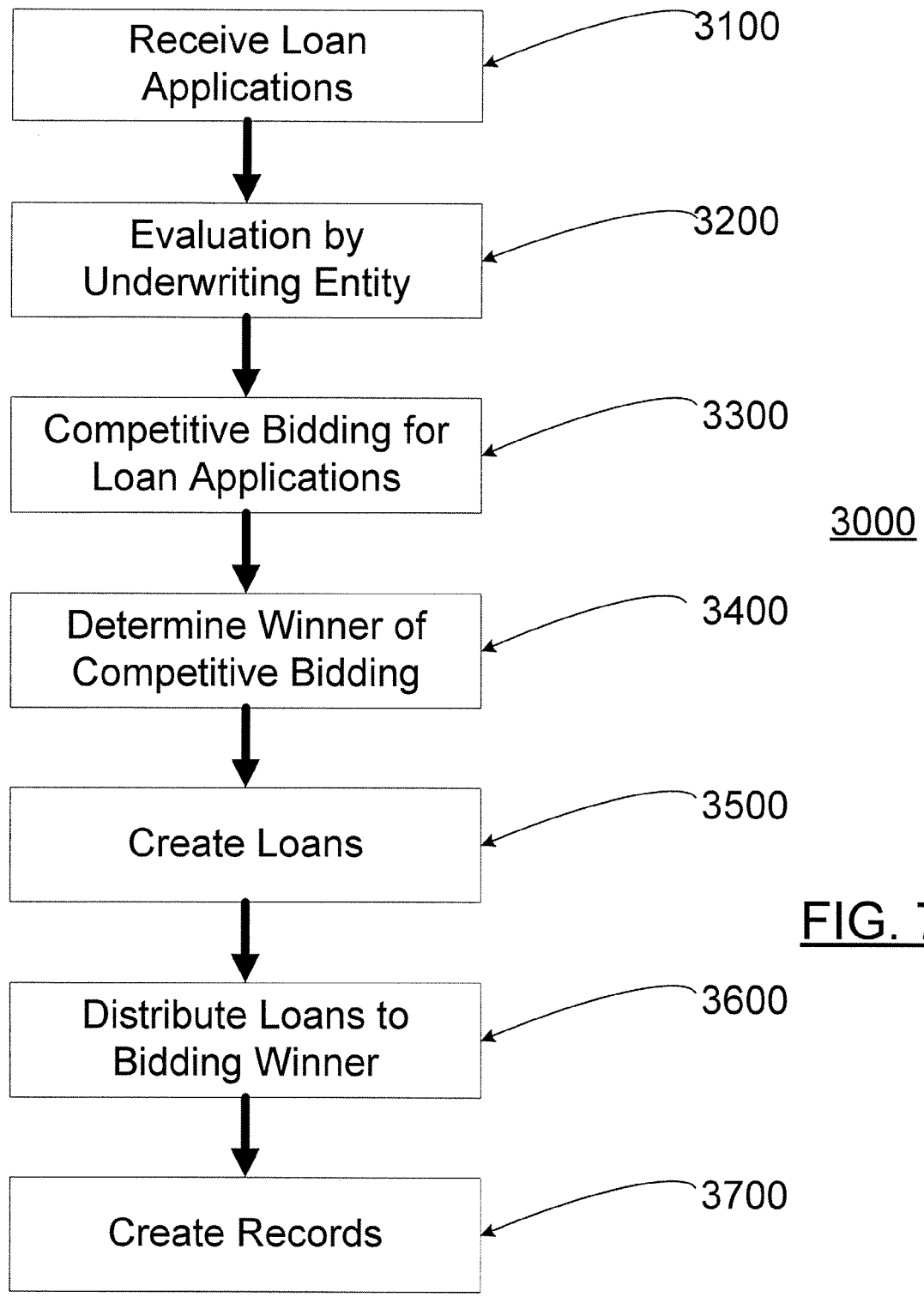
FIG. 7 is a flowchart depicting a third embodiment of a method for processing a loan application.

A third exemplary embodiment of a method 3000 for processing loan applications is illustrated in FIG. 7. The method 3000 of FIG. 7, and variations thereof, may be practiced in connection with the system 200 shown in FIG. 6, or with other systems, such as the other system embodiments 10, 100 described herein. Additionally, the method 3000 contains some steps that are similar to those of the method 1000 shown in FIG. 2 and the method 2000 shown in FIG. 5 and described above. At step 3100, at least one loan application is received, at the origination entity 12, from at least one applicant, similarly to steps 1100 and 2100 above. At step 3200, each loan application is submitted to the underwriting entity 19 for evaluation, along with at least some of the information gathered for each loan application, similarly to steps 1200 and 2200 above.

At step 3300, each of the loan applications is subjected to competitive bidding among one or more of the portfolio management entity 15, the syndication management entity 16, the securitization management entity 17, and the plurality of third parties 36. Generally, as described above, the auction system 234 is computer-based and hosts a computer-based forum for this competitive bidding. In the exemplary embodiment of the system 200 shown in FIG. 6 and described above, the auction system 234 contains a website hosting a web-based forum for such competitive bidding. It is contemplated that the bidding in step 3300 can be performed in a similar manner as the bidding described above in step 2300 of the method 2000. As described above, each bidding entity 15, 16, 17, 36 may use various criteria in determining a bid amount. Additionally, the bid may take one of many different forms, and may also include conditions, such as proposed changes to the terms of the application. Further, it is contemplated that in at least some embodiments, all bidding entities 15, 16, 17, 36 may be required to submit bids in the same format. In one exemplary embodiment of the method 3000, the bidding entities 15, 16, 17, 36 submit bids by offering a price to buy a particular loan, allowing for objective evaluation between entities 15, 16, 17 within the financial institution 11 and third party entities 36. This competitive bidding maximizes the creation rate of loans and helps ensure optimum distribution of loans. As described above, this arrangement benefits the financial institution 11, the third party entities 36, and the applicants, as it can result in the creation of more loans and the distribution of those loans to the entity best equipped for, or most desirous of, each loan.

The forum for competitive bidding may be presented in a variety of manners. Additionally, at least some of the information gathered by the origination entity 12 in connection with the loan application may be submitted on the forum. In one embodiment, the forum may present each loan application as a separate posting or listing. In this embodiment, the bidding entities 15, 16, 17, 36 may gather information and submit bids for a loan application by accessing the listing. Other techniques and formats for presenting the forum are contemplated as well.

It is understood that at some point during the method 3000, some or all of the loan applications may be reviewed to determine whether each application is acceptable for placement in the portfolio, syndication, and/or securitization, similarly to step 1300 above. It is also understood that at some point during the method 3000, some or all of the loan applications may be analyzed to determine projected profitability values for placement in the portfolio, syndication, and/or securitization, similarly to step 1700 above. This review and/or analysis, as well as the acceptability and/or projected profitability values produced thereby, may be used in the method 3000 similarly to the manner described above with respect to the method 2000. It is further contemplated that, in some embodiments, the bidding process may include messages from the distribution entity 14, or one or more of the third party entities 36, to the origination entity 12, which may include conditions for the bid, similarly to step 1400 above. These conditions may be transmitted to the applicant for consideration, as also described above.

In some embodiments, the financial institution 11 may place bidding restrictions on one or more of the entities 15, 16, 17 of the distribution entity 14, as described above. For example, one or more of the entities 15, 16, 17 may be precluded from bidding on a loan application which has been determined to be unacceptable for that particular entity 15, 16, 17. In a more specific example, the portfolio management entity 15 may be precluded on bidding for loan applications denied by the underwriting entity 19.

At step 3400, a winner of the competitive bidding is determined, among the bidding entities 15, 16, 17, 36. This determination may be done similarly to the determination described above at step 2400. In some embodiments, determination of the winner of the bidding may establish some contractual relationship between the winning entity and the financial institution 11. It is understood that additional paperwork may be necessary to establish the desired contractual relationship.

At step 3500, loans are created by the origination entity corresponding to each loan request that receives at least one bid by at least one of the portfolio management entity 15, the syndication management entity 16, and the securitization management entity 17. This creation may be performed similarly to steps 1500 and 2500 above.

At step 3600, each loan is distributed through the winner of the competitive bidding among the portfolio management entity 15, the syndication management entity 16, the securitization management entity 17, and the third party entities 36, similarly to steps 1600 and 2600 above.

At step 3700, records related to each loan application are created and stored, including a prime record for each loan, similarly to steps 1800 and 2800 above.

Figure 8:
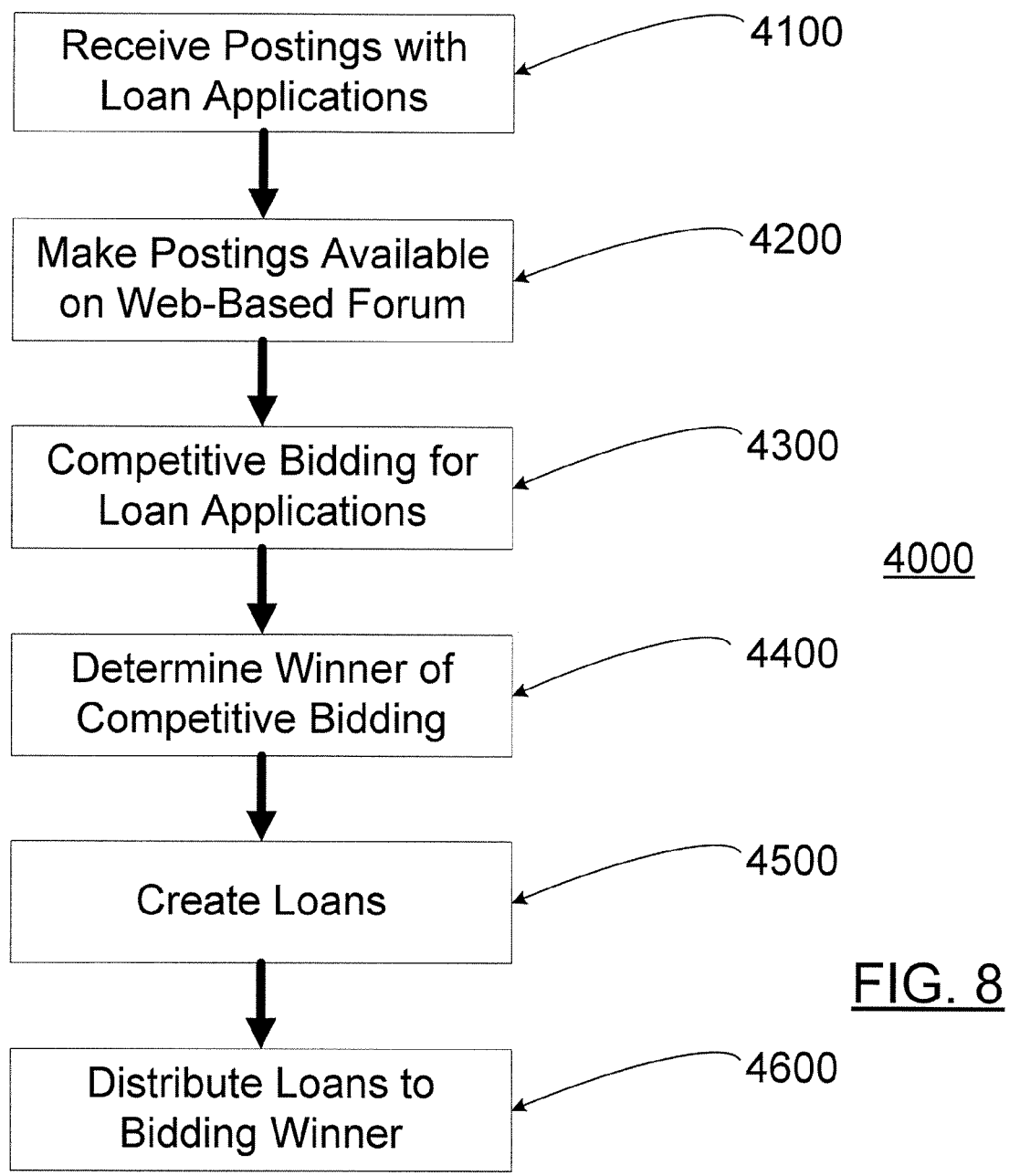
FIG. 8 is a flowchart depicting a fourth embodiment of a method for processing a loan application.

A fourth exemplary embodiment of a method 4000 for processing loan applications is illustrated in FIG. 8. The method 4000 of FIG. 8, and variations thereof, may be practiced in connection with the system 200 shown in FIG. 6, or with other systems, such as the other system embodiments 10, 100 described herein. Additionally, the method 4000 contains some steps that are similar to those of the methods 1000, 2000, and 3000 shown in FIGS. 2, 5, and 7 and described above. The method 4000 provides for processing loan applications originated not only by the origination entity 12 of the financial institution 11, but also by third party entities 36 accessing the auction system, such as via the web portal 30. Thus, generally, the method 4000 may be configured to interact equally with a plurality of entities, including the origination entity 12, the distribution entity 14, and the third party entities 36.

At step 4100, a plurality of postings are received from one or more of the plurality of entities, which may include the origination entity 12 and one or more third party entities 36. Each posting includes information regarding one of the plurality of loan applications, and each loan application is originated by the entity 12, 36 associated with the posting through contact with a corresponding applicant, as described above with respect to step 1100. It is contemplated that in some embodiments, all of the plurality of loan applications are originated by one entity, and all of the plurality of postings are received from the one entity.

At step 4200, the plurality of postings are made available to the entities on the forum, which may include the portfolio management entity 15, the syndication management entity 16, and the securitization management entity 17 of the distribution entity 14, as well as one or more third party entities 36. The postings may be made available through a computer-based forum for competitive bidding, as described above with respect to steps 2300 and 3300, such as a website provided by the auction system 234.

At step 4300, one or more competitive bids for each loan application are received, for example, through the web portal 30. Each bid is submitted by one of the plurality of entities 15, 16, 17, 36. Each entity 12, 14, 36 may provide for underwriting, reviewing, and/or analyzing each loan application, in a manner such as those described above, in connection with the competitive bidding.

At step 4400, a winning bid for each loan application is determined from the plurality of bids submitted by the entities 15, 16, 17, 36, similarly to steps 2400 and 3400 above. The entity 15, 16, 17, 36 submitting the winning bid is determined to be the winner for the competitive bidding. In some embodiments, determination of a winner of the bidding may establish some contractual relationship between the winning entity and the entity originating the loan application. It is understood that additional paperwork may be necessary to establish the desired contractual relationship.

At step 4500, the entity 12, 36 originating each loan application creates a loan with the corresponding applicant, similarly to steps 1500, 2500, and 3500 above.

At step 4600, each loan is distributed to the entity 15, 16, 17, 36 submitting the winning bid for the loan application, similarly to steps 1600, 2600, and 3600 above.

Records related to each loan application may be created and stored by the financial institution 11 or one of the third party entities 36, including a prime record for each loan, similarly to steps 1800, 2800, and 3700 above. These records may be created by the institution 11 operating the auction system 234, or by the entity 12, 14, 36 originating or winning each loan application, or by another entity, in various embodiments.

Figure 9:
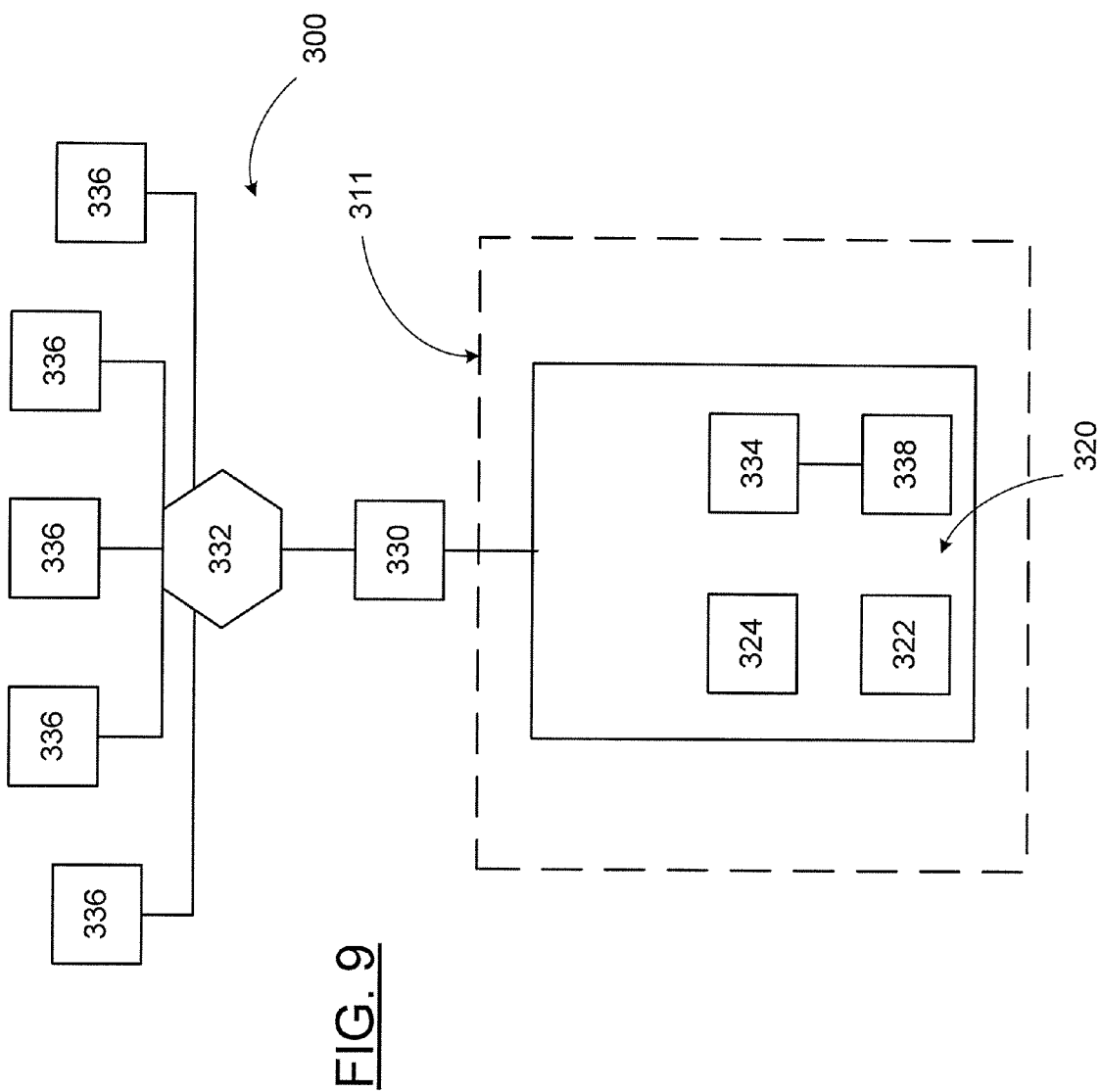
FIG. 9 is a schematic view of a fourth embodiment of a system for processing a loan application.

It is contemplated that some embodiments of the method described herein, such as the embodiment 4000 of FIG. 8, may alternately be practiced by an institution that does not contain an origination entity and/or a distribution entity. Such an institution may even exist solely to operate the auction system. Accordingly, a fifth exemplary embodiment of a method for processing loan applications is practiced similarly to the method 4000 shown in FIG. 8 and described above, but may be practiced by a system such as the exemplary system 300 illustrated in FIG. 9, which includes an institution 311 containing a computer system 320 with a memory 322 and a processor 324. The computer system 320 supports an auction system 334. Additionally, a moderator 338 may be included in the system 300. Similar to the embodiments described above, the auction system 334 is generally computer-based, and may be accessed through a variety of means, such as a public network and/or a private network. In the exemplary embodiment illustrated, the computer system 320 and the auction system 334 are connected to a plurality of entities 336 through a web portal 330. As stated above, in one embodiment, all of the entities 336 are third party entities. In this method, all of the postings for originated loan applications may be received from entities 336, in step 4100, and the postings may be made available only to entities 336, in step 4200. Similarly, all of the bids received for each loan application may be received from entities 336, in step 4300. Otherwise, the method may be practiced as the method 4000 described above. It is understood that some of the entities 336 may only originate loan applications and do not bid on loan applications, while other entities 336 may only bid on loan applications without originating any applications, and still other entities 336 may both originate and bid on loan applications. In some embodiments, the institution 311 operating the auction system 334 may include an origination entity and/or one or more distribution entities, such as a portfolio management entity, a syndication management entity, or a securitization management entity, and that the entities 336 may include such an origination entity or distribution entity.

Figure 10:
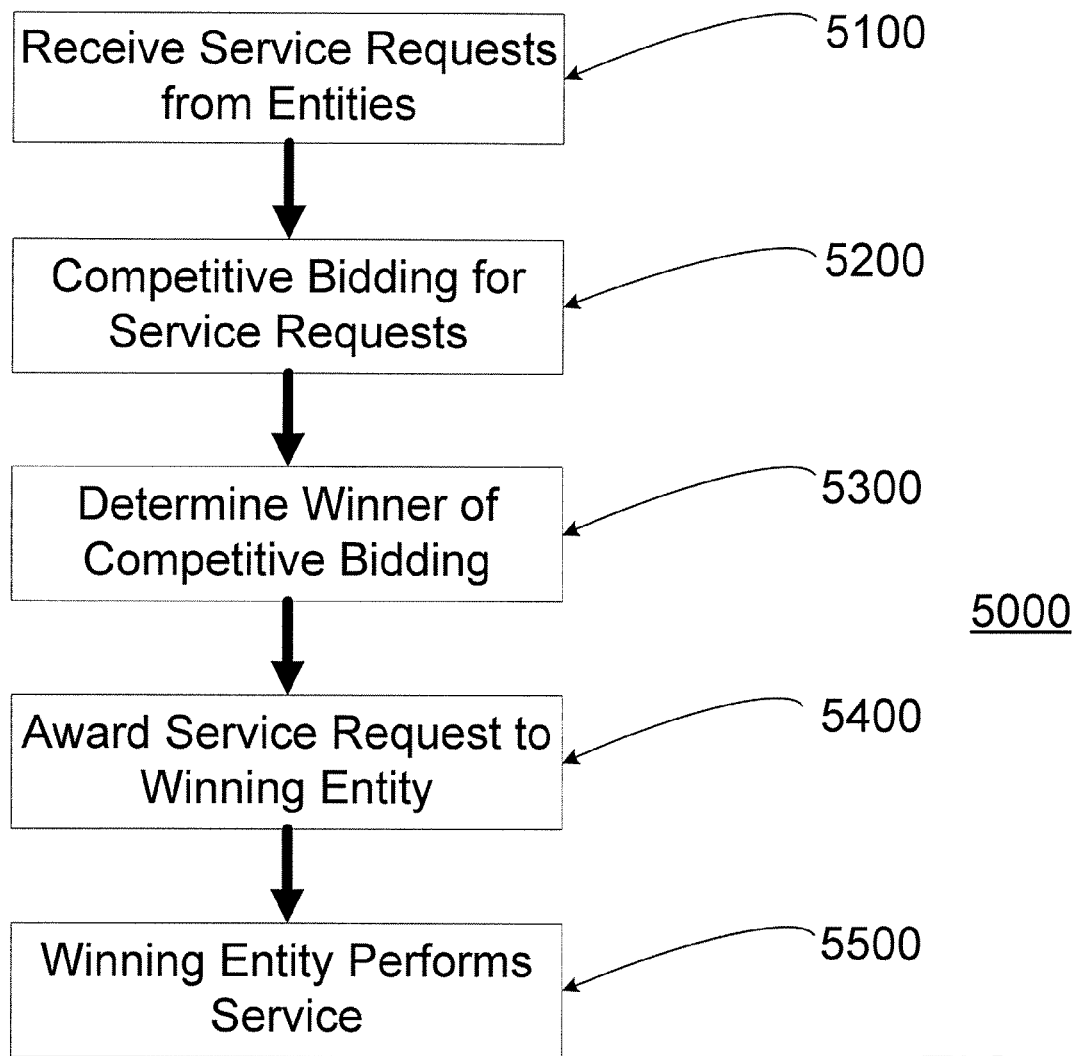
FIG. 10 is a flowchart depicting a fifth embodiment of a method for processing a loan application.

A sixth exemplary embodiment of a method 5000 for processing loan applications is illustrated in FIG. 10. In a general sense, the method 5000 provides for market offers and competitive bidding for services to be performed in connection with processing loans and loan applications. Accordingly, the method 5000 may be practiced independently in a stand-alone manner, or may be joined with one of the other embodiments of the methods described above. Additionally, the method 5000 and variations thereof, may be practiced in connection with the system 200 shown in FIG. 6, or with other systems, such as the other system embodiments described herein.

Nearly any service associated with processing a loan or loan application may be auctioned and outsourced through the present method 5000. One example of such a service is underwriting a loan application. Accordingly, one of the entities 36 bidding for some of the service requests may be an underwriting entity. Another example of such a service is collecting payments on a loan already created. A further example of such a service is processing paperwork related to a loan application.

At step 5100, one or more service requests are received from one or more entities. Each service request is associated with one or more services to be performed in connection with processing a loan application for the entity corresponding to the service request. In various embodiments, the service requests may be received by different entities. For example, in the system 200 of FIG. 6, the service request may be received by the auction system 234, such as through the web portal 30, from one of the entities connected to the auction system 234, including the financial institution 11 and the third party entities 36. It is understood that many different services may be auctioned for a single loan or application, and thus, that multiple service requests may be received for a single loan or application. It is also understood that one service request may include a package of services for a single loan or application, or a package of services for a plurality of loans or applications.

At step 5200, each service request is subjected to competitive bidding among one or more entities involved in the competitive bidding process, such as the financial institution 11 and the third party entities 36. Thus, bids are received from one or more entities 11, 36 in accordance with the method. A forum for the competitive bidding may be provided in any of the manners described above. For example, in the system 200 shown in FIG. 6 and described above, the auction system 234 contains a website hosting a web-based forum for such competitive bidding. It is contemplated that the bidding in step 5200 can be performed in a similar manner as the bidding described above with respect to other embodiments. As described above, each bidding entity 11, 36 may use various criteria in determining a bid amount. Additionally, the bid may take one of many different forms, and may also include conditions for the bid. Further, it is contemplated that in at least some embodiments, all bidding entities 11, 36 may be required to submit bids in the same format. In one exemplary embodiment of the method 5000, the bidding entities 11, 36 submit bids by offering a price to perform a particular service, allowing for objective evaluation between the entities 11, 36.

At step 5300, a winning bid for each service request is determined. As described above, the winner may be determined in one of a variety of manners, including manually or automatically through an algorithm. For example, in one embodiment, the entity 11, 36 submitting the bid with the lowest price is determined to be the winner. In another embodiment, the entity 11, 36 submitting the service request may supply the criteria for determining the winner, or may itself determine the winner of the bid.

At step 5400, the service request is awarded to the entity 11, 36 submitting the winning bid. This step may establish some contractual relationship between the winning entity and the entity submitting the service request. It is understood that additional paperwork may be necessary to establish the desired contractual relationship.

At step 5500, the entity 11, 36 submitting the winning bid for the service request performs the one or more services contained in the request, in connection with processing the corresponding loan or application.

Some embodiments of the system and method described herein may be configured to allow for "reverse inquiry" from the bidding entities to the entity originating each loan request. Such reverse inquiries may include requests for origination of loans having certain characteristics, and may be based on various concerns, such as diversification in a portfolio or demand for a particular type of syndicated or securitized loan. For example, in the systems 10 and 100 described above and illustrated in FIGS. 1 and 4, the gateway 26 may allow transmission of reverse inquiries to the origination entity 12 from the distribution entity 14, including the portfolio management entity 15, the syndication management entity 16, or the securitization management entity 17. In another example, in the system 200 described above and illustrated in FIG. 6, the gateway 26 may be configured to allow reverse inquiries from third party entities 36 to the origination entity 12 as well. In a further example, the system 300 described above and illustrated in FIG. 9 may be configured to allow for reverse inquiries from any of the entities 336 bidding on a loan application or service request to one or more entities 336 that originate and/or post loan applications or service requests.

As described above, some embodiments of the system and method described herein involve presentation of information regarding a loan application or a loan applicant on a public or semi-public forum. Certain information may not be suitable for public knowledge for various reasons, including privacy protection and other legal concerns. Accordingly, in some embodiments, private applicant information is filtered from the information for each loan application, such that the private applicant information is not presented in the forum. This filtering may be performed by the entity originating each loan application, in one embodiment. In another embodiment, the web portal 30 may include software or other features to automatically filter information fitting a certain profile.

As stated above, FIGS. 2, 3, 5, 7, 8, 10, and 11 illustrate examples of one or more aspects of the present method for processing loans and loan applications. The steps of the methods described above can be accomplished by means and/or components contained within the financial institution 11, such as the institutional employees or the computer systems 13, 19, 20, including the memories and processors associated therewith (such as memory 22 and processor 24), or a combination of employees and computer components. It is understood that "automatically" performing actions or functions implies actions by automated and/or computerized components, and do not incorporate significant action by institutional employees or other significant manual effort. Additionally, the web portal 30 constitutes one means for receiving, transmitting, and other electronic communication-related actions and functions described herein. As described above, electronic communications can be transmitted and received through a public network and/or a private network. Mail and other physical shipping methods constitute possible means for non-electronic communications. Alternate communication means are also disclosed herein. Other components of the system and the financial institution 11 may also constitute means for accomplishing aspects of the present invention, as understood by those skilled in the art. It is understood that the financial institution 11 may not perform each and every aspect of the present invention and that the institution 11 may outsource aspects to one or more other entities.

Aspects of the present invention are operational with numerous other general purpose or special purpose computing system environments or configurations. Examples of well known computing systems, environments, and/or configurations that may be suitable for use with the present invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the present invention may be described in the general context of computer-executable instructions, such as program modules, being executed by a computer. Generally, program modules include routines, programs, objects, components, data structures, etc. that perform particular tasks or implement particular abstract data types. The present invention may also be practiced in distributed computing environments where tasks are performed by remote processing devices that are linked through a communications network. In a distributed computing environment, program modules may be located in the one or more of the memories, such as memory 22, which may include both local and remote computer storage media including memory storage devices. It is understood that connections and communications disclosed herein may be made by any type of wired or wireless connection or communication.

It is understood that some of the steps described in the exemplary methods above may not be performed in some embodiments. It is also understood that the exemplary methods described above may contain additional steps not described herein.

The various embodiments of the system and method described herein provide benefits and advantages not provided by prior systems and methods. In many prior systems and methods, each loan application is only reviewed for suitability for placement in a portfolio, and such approved loans may be later chosen for syndication or securitization. However, this approach results in denial of loans that may be profitable for syndication or securitization, but not for portfolio placement. By reviewing the denied loan applications specifically for syndication and securitization profitability, the financial institution 11 can accept more applications, creating more loans and greater potential profit for the institution 11. Additionally, incorporating internal competitive bidding into the process of selection between different distribution mechanisms for a financial institution works to ensure that each loan is distributed in the most profitable manner possible. Configuring the system and method to incorporate origination and competitive bidding for loan applications from external sources provides further maximized profit and efficiency not only for the institution operating the auction forum, but also for the many external entities involved in the forum. Likewise, bidding for services related to loans and application also enhances efficiency and profit for all entities involved in the transaction. Further, in many prior systems and methods, prime records are not adequately kept for securitized and/or syndicated loans. Configuring the system to consistently create and store prime records provides great benefit to an institution though decreased risk, as well as other reasons. Still further, through automation of many of the steps in processing a loan application, the disclosed system and method provide increased efficiency and profit.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," etc., as used herein, are intended for illustrative purposes only and do not limit the embodiments in any way. Additionally, the term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A computer-implemented method comprising:

storing, in memory, information regarding a plurality of loan applications from a plurality of applicants, received at an origination entity of a financial institution comprising the origination entity and a distribution entity;

transmitting, by a processor connected to the memory, at least some of the information for each of the plurality of loan applications to an underwriting entity for evaluation, wherein the underwriting entity approves at least some of the plurality of loan applications to create a plurality of approved loan applications and denies at least some of the plurality of loan applications to create a plurality of denied loan applications;

transmitting, by the processor, at least some of the information for each of the denied loan applications to the distribution entity, wherein the distribution entity determines whether each denied loan application is acceptable for syndication and whether each denied loan application is acceptable for securitization; and receiving, at the processor, at least one message comprising an indication of whether a first of the denied loan applications is acceptable for syndication, acceptable for securitization, acceptable for both syndication and securitization, or not acceptable for syndication or securitization, wherein when the first denied loan application is acceptable for both syndication and securitization, the at least one message further comprises an indication of an optimum distribution mechanism determined by the distribution entity for the loan application selected from syndication or securitization, and wherein a first loan resulting from the first loan application is distributed according to the optimum distribution mechanism;

wherein the distribution entity comprises a syndication management entity and a securitization management entity, further comprising:

providing, by the processor, a forum for competitive bidding between the syndication management entity and the securitization management entity, for each of the plurality of denied loan applications, wherein when the processor receives a bid from the syndication management entity for the first denied loan application, the first application is acceptable for syndication, wherein when the processor receives a bid from the securitization management entity for the first denied loan application, the first application is acceptable for securitization, and wherein the optimum distribution mechanism is determined based on a winner of the competitive bidding between the syndication management entity and the securitization management entity.

2. The method of claim 1, wherein the message further comprises at least one condition for the first denied loan application to be acceptable for at least one of syndication and securitization.

3. The method of claim 1, further comprising:
receiving, at the processor, from the distribution entity, a plurality of messages, each message corresponding to one of the plurality of denied loan applications and comprising an indication of whether the corresponding denied loan application is acceptable for at least one of syndication and securitization.

4. The method of claim 1, wherein a bid by one of the syndication management entity and the securitization management entity comprises at least one condition for the denied loan application to be acceptable for syndication or securitization, respectively.

5. The method of claim 1, wherein when the optimum distribution mechanism for the first application is determined to be syndication, the origination entity creates a first loan corresponding to the first loan application, and the distribution entity syndicates the first loan.

6. The method of claim 1, wherein when the optimum distribution mechanism for the first application is determined to be securitization, the origination entity creates a first loan corresponding to the first loan application, and the distribution entity securitizes the first loan.

7. The method of claim 1, wherein the first application is determined to be acceptable for securitization, the method further comprising:
receiving, at the processor, from the distribution entity, a second message comprising a request for the origination entity to seek out loans meeting specified criteria.

8. A computer-implemented method comprising:
storing, in memory, information regarding a plurality of applications for loans from a plurality of applicants, received at an origination entity of a financial institution comprising the origination entity and a distribution entity, the distribution entity comprising a portfolio management entity, a syndication management entity, and a securitization management entity; and
determining optimum distribution mechanisms for the plurality of loan applications based on a winner of a competitive bidding, comprising providing, by a processor connected to the memory, a forum for the competitive bidding among the portfolio management entity, the syndication management entity, and the securitization management entity, for each of the plurality of loan applications.

9. The method of claim 8, further comprising:
transmitting, by a processor connected to the memory, at least some of the information for each of the plurality of loan applications to an underwriting entity for evaluation, wherein the underwriting entity approves at least some of the plurality of loan applications to create a plurality of approved loan applications and denies at least some of the plurality of loan applications to create a plurality of denied loan applications,
wherein the forum is provided by the processor for competitive bidding among the portfolio management entity, the syndication management entity, and the securitization management entity, for each of the plurality of approved loan applications.

10. The method of claim 9, further comprising:
providing, by the processor, the forum for competitive bidding between the syndication management entity and the securitization management entity, for each of the plurality of denied loan applications.

11. The method of claim 8, wherein the origination entity creates a plurality of loans, each loan corresponding to one of the loan applications; and wherein each loan is distributed according to the optimum distribution mechanism for each corresponding loan application among the portfolio management entity, the syndication management entity, and the securitization management entity, via placing the loan in a portfolio of the financial institution, syndicating the loan, or securitizing the loan, respectively.

12. The method of claim 8, wherein the processor further provides a web portal configured for providing access to the forum by the portfolio management entity, the syndication management entity, and the securitization management entity for competitive bidding.

13. The method of claim 8, wherein the forum for competitive bidding comprises a website.

14. A computer system comprising:
a memory configured for storing information regarding a plurality of loan applications from a plurality of applicants received at an origination entity of a financial institution comprising the origination entity and a distribution entity comprising:
a portfolio management entity for managing loans in a portfolio of the distribution entity;
a syndication management entity for managing syndication of loans; and
a securitization management entity for managing securitization of loans; and
a distribution processor in communication with the memory, the distribution processor configured for assisting in determining optimum distribution mechanisms for the plurality of loan applications by providing a computer-based forum for competitive bidding between at least two of the portfolio management entity, the syndication management entity, and the securitization management entity, for each of the plurality of loan applications, wherein the optimum distribution mechanism for each loan application is determined based on a winner of the competitive bidding.

15. The computer system of claim 14, wherein the forum is a web-based forum, wherein the processor is further configured to provide a web portal providing connection between the origination entity, the portfolio management entity, the syndication management entity, the securitization management entity, and the web-based forum.

16. The computer system of claim 14, wherein at least some of the plurality of loan applications are approved by an underwriting entity to create a plurality of approved loan applications and at least some of the plurality of loan applications are denied by the underwriting entity to create a plurality of denied loan applications.

17. The computer system of claim 16, wherein the processor is configured to provide the forum for hosting competitive bidding among the portfolio management entity, the syndication management entity, and the securitization management entity, for each of the plurality of approved loan applications, and for hosting competitive bidding between the syndication management entity and the securitization management entity, for each of the plurality of denied loan applications.

18. The computer system of claim 16, wherein the processor is further configured for transmitting at least some of the information regarding each of the denied loan applications to the syndication management entity for review to determine whether each denied loan application is acceptable for syndication, and for transmitting at least some of the information regarding each of the denied loan applications to the securitization management entity for review to determine whether each denied loan application is acceptable for securitization.

19. The computer system of claim 18, wherein loans corresponding to each of the denied loan applications determined to be acceptable for at least one of syndication and securitization are created by the origination entity, and are distributed according to the optimum distribution mechanism for each loan application.

20. The computer system of claim 18, wherein the processor is further configured to receive, from the syndication management entity and the securitization management entity, a plurality of messages, each message containing an indication of whether a corresponding one of the denied loan applications is acceptable for syndication or securitization, respectively.

21. The computer system of claim 20, wherein at least some of the messages further comprise at least one condition for the corresponding denied loan application to be acceptable for syndication or securitization, respectively.

22. A computer-implemented method comprising:
   storing, in memory, information regarding a plurality of loan applications from a plurality of applicants, received at an origination entity of a financial institution comprising the origination entity and a distribution entity comprising a syndication management entity and a securitization management entity;
   transmitting, by a processor connected to the memory, at least some of the information for each of the plurality of loan applications to an underwriting entity for evaluation, wherein the underwriting entity approves at least some of the plurality of loan applications to create a plurality of approved loan applications and denies at least some of the plurality of loan applications to create a plurality of denied loan applications;
   transmitting, by the processor, at least some of the information for each of the denied loan applications to the distribution entity; and
   determining optimum distribution mechanisms for the plurality of denied loan applications, comprising providing, by the processor, a forum for competitive bidding between the syndication management entity and the securitization management entity, for each of the plurality of denied loan applications, wherein the optimum distribution mechanism for each loan application is determined based on a winner of the competitive bidding, and
   wherein a loan is created by the origination entity for each loan application receiving at least one bid, and each loan is distributed according to the optimum distribution mechanism for the respective loan.

23. The method of claim 22, wherein the distribution entity further comprises a portfolio management entity, and wherein the processor further provides the forum for competitive bidding between the syndication management entity, the securitization management entity, and the portfolio management entity.

24. The method of claim 22, further comprising:
   transmitting, by the processor, at least some of the information for each loan application receiving at least one bid to the winner of the competitive bidding for the respective loan, wherein the loan is created by the origination entity using the information transmitted.

* * * * *